United States Patent
Lee et al.

(10) Patent No.: US 8,447,152 B2
(45) Date of Patent: May 21, 2013

(54) WAVEGUIDE COUPLING DEVICE WITH PROPERTIES OF FORWARD AND BACKWARD COUPLING AS WELL AS MANUFACTURING METHOD THEREOF

(75) Inventors: Ming-Chang Lee, Hsinchu (TW); Kai-Ning Ku, Baoshan/Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 166 days.

(21) Appl. No.: 13/207,305

(22) Filed: Aug. 10, 2011

(65) Prior Publication Data
US 2012/0141069 A1 Jun. 7, 2012

(30) Foreign Application Priority Data
Dec. 1, 2010 (TW) ................................ 99141766 A

(51) Int. Cl.
G02B 6/26 (2006.01)
G02B 6/42 (2006.01)
G02B 6/12 (2006.01)
H01L 21/02 (2006.01)

(52) U.S. Cl.
USPC ............................................. 385/39; 385/43

(58) Field of Classification Search
USPC ........... 385/39, 40, 41, 43, 48, 31, 50; 65/386
See application file for complete search history.

(56) References Cited

U.S. PATENT DOCUMENTS

| 5,799,119 | A * | 8/1998 | Rolland et al. ................... 385/28 |
| 6,993,225 | B2 * | 1/2006 | Patel et al. ....................... 385/43 |
| 2005/0185893 | A1 * | 8/2005 | Liu ................................... 385/50 |
| 2009/0245728 | A1 * | 10/2009 | Cherchi et al. ................... 385/28 |
| 2011/0116741 | A1 * | 5/2011 | Cevini et al. .................... 385/28 |
| 2012/0006382 | A1 * | 1/2012 | Dagli et al. .................... 136/246 |
| 2012/0093456 | A1 * | 4/2012 | Taillaert et al. ................. 385/14 |
| 2012/0230635 | A1 * | 9/2012 | Yoshida .......................... 385/43 |

* cited by examiner

Primary Examiner — Akm Enayet Ullah

(57) ABSTRACT

The present invention relates to a waveguide coupling device with properties of forward coupling and backward coupling as well as a manufacturing method thereof, the waveguide coupling device comprises: a substrate, at least one inverted taper coupling structure, an intermediate layer, and at least one three-dimensional taper coupling structure. Wherein one end of the three-dimensional taper coupling structure is adopted for connecting to an external optical fiber, so as to couple the optical wave propagating in the optical fiber; Moreover, by way of the specific coupling sequence of (three-dimensional taper coupling structure)-(intermediate layer)-(inverted taper coupling structure), the optical wave may be efficiently coupled into, be confined in, and ultimately propagates in the inverted taper coupling structure connecting to waveguide devices. In addition, through the manufacturing method, the waveguide coupling device with properties of forward coupling and backward coupling can be massively fabricated by the present semiconductor process with low cost.

18 Claims, 16 Drawing Sheets

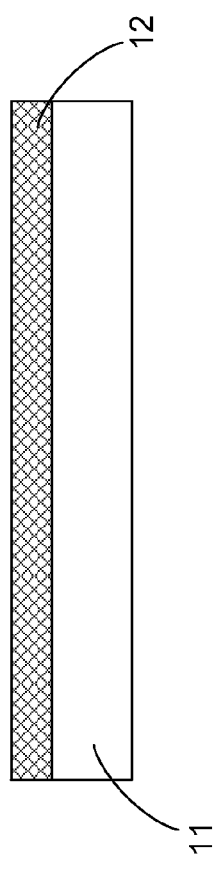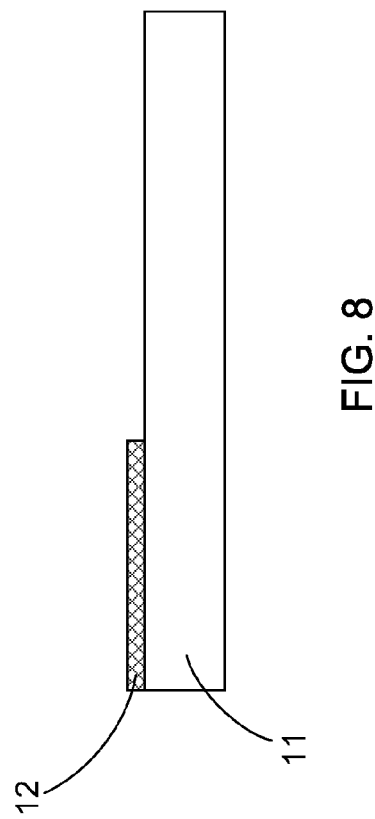

WAVEGUIDE COUPLING DEVICE WITH PROPERTIES OF FORWARD AND BACKWARD COUPLING AS WELL AS MANUFACTURING METHOD THEREOF

CROSS-REFERENCE TO RELATED APPLICATION

This application claims foreign priority from a Taiwan Patent Application, Ser. No. 099141766, filed on Dec. 1, 2010.

BACKGROUND OF THE INVENTION

1. Technical Field

The present invention relates to a waveguide coupling device, and more particularly, to a waveguide coupling device with properties of forward coupling and backward coupling as well as a manufacturing method thereof, used for high efficient waveguide and fiber coupling. The forward coupling is defined by optical wave propagating from an external fiber to a waveguide whereas the backward coupling is defined by optical wave propagating from a waveguide to an external fiber.

2. Description of Related Art

In recent years, since the advancement of network and information transmission, the transmission volume of data completed through Internet has been obviously increased; thus, the traditional data transmission way carried out by a coaxial cable is inadequate for high data throughput. However, compared with the coaxial cable, fibers have several advantages, such as high communication capacity, low signal loss, anti-electromagnetic interference, light weight, and small size; therefore, the fiber has been became the main component used in data transmission.

In addition to fibers, integrated photonic devices used for optical signal processing and high-speed electrical-to-optical or optical-to-electrical conversion also play an important role in the applications of optical interconnect. Integrated photonic devices include active and passive components, wherein the active component is referred to the device which can perform energy conversion, for example, an electro-optic modulator can carry out electro-optical conversion of generating optical signals. The passive component is referred to the device without energy conversion, for instance, waveguide couplers. A waveguide coupler is able to divert the optical power between a waveguide and another waveguide, or between a fiber and the waveguide.

Please refer to FIG. 1, which illustrates a stereo view of a conventional optical waveguide device. As shown in FIG. 1, the optical waveguide device 25' includes: a substrate 252', a top layer 254' and a waveguide layer 256', wherein the optical wave is propagating in the waveguide layer 256'. The optical waveguide device 25' shown in FIG. 1 is a butt coupling device and the structure thereof is very simple. Traditionally, the waveguide layer 256' is rectangle structure, however, for connecting to the fiber, the waveguide layer 256' is made to circular structure when manufacturing the optical waveguide device 25'. The aforesaid optical waveguide device 25' can be integrated to a miniaturized structure by using semiconductor materials and related semiconductor process, and that is the main advantage of the optical waveguide device 25'. The main shortcoming of the optical waveguide device 25' is that the height (thickness) of the waveguide layer 256' can not be designed too high, so that, it is difficult for the optical waveguide device 25' to connect with the fiber (the diameter of fiber core is around 8 μm).

Besides, please refer to FIG. 2, which illustrates a stereo view of a conventional optical waveguide device with a surface grating. As shown in FIG. 2, the optical waveguide device 1' with the surface grating includes: a substrate 2' and an optical waveguide 3'. The optical waveguide 3' is formed on a base surface 21' of the substrate 2', and has a top surface 31', a first side surface 32' and a second side surface 33'. Moreover, a surface grating 4' is consisted of a plurality of indentations 30' and formed on the first side surface 32', wherein the period of the surface grating 4' is determined by the spacing distance between the plurality of indentations 30'. The aforesaid optical waveguide device 1' is a surface coupling device, which is able to couple the optical wave with a specific wavelength through the surface grating 4' thereof, for example, coupling the optical wave with the wavelength 1490 nm. Besides, the period of the surface grating 4' can be adjusted by changing the spacing distance between the indentations 30', so as to make the optical waveguide 3' couple and transmit the optical waves with different wavelengths via the surface grating 4'.

The aforesaid optical waveguide device 1' has a main advantage, that is, the optical waveguide device 1' is capable of being changed the period of the periodic surface grating 4' thereof, such that the optical waveguide device 1'may couple the optical wave with the specific wavelength. Moreover, to prevent from damage occurred in combining the surface grating 4' with the fiber, a protection layer is formed on the surface grating 4'. However, the formed protection layer reduces the optical coupling efficiency of the optical waveguide device 1'; besides, the surface grating 4' must achieve phase matching with the optical wave in period when using the optical waveguide device 1' to couple the optical wave, so that the operation of high-efficiency optical wave coupling can be accomplished. However, such limitation (phase matching) reduces the whole coupling efficiency of the optical waveguide device 1' for broadband optical wave.

Accordingly, in view of the optical waveguide device (i.e., the butt coupling device with simple structure) and the optical waveguide device with the surface grating (i.e., the surface coupling device capable of coupling the optical wave with the particular wavelength) still have shortcomings and drawbacks, the inventor of the present application has made great efforts to make inventive research thereon and eventually provided a waveguide coupling device with properties of forward coupling and backward coupling as well as a manufacturing method thereof.

BRIEF SUMMARY OF THE INVENTION

The primary objective of the present invention is to provide a waveguide coupling device with properties of forward coupling and backward coupling, in which, at least one three-dimensional taper coupling structure and at least one inverted taper coupling structure are formed, and the three-dimensional taper coupling structure is adopted for connecting to an external optical fiber, so that an optical wave propagating in the optical fiber can be coupled into the intermediate layer efficiently, and then the optical wave can be further coupled to waveguide through the inverted taper coupling structure.

Accordingly, to achieve the abovementioned primary objective of the present invention, the inventor proposes a waveguide coupling device with properties of forward coupling and backward coupling, comprising:

a substrate;

at least one inverted taper coupling structure, being formed on the substrate for confining and propagating an optical wave in the inside thereof;

an intermediate layer, being formed on the substrate and covering the inverted taper coupling structure; and at least one three-dimensional taper coupling structure, being formed on the intermediate layer and used for connecting to an external fiber by one terminal thereof, so as to couple the optical wave transported by the fiber;

wherein the refractive index of the intermediate layer is very close to that of the three-dimensional taper coupling structure, therefore, the optical wave would regard the intermediate layer and the three-dimensional taper coupling structure as the identical material when propagating in the three-dimensional taper coupling structure, such that the optical wave may be coupled into the inverted taper coupling structure through the intermediate layer.

Another objective of the present invention is to provide a manufacturing method for a waveguide coupling device with properties of forward coupling and backward coupling, therefore, through the manufacturing method, the waveguide coupling device with properties of forward coupling and backward coupling can be massively fabricated by the present semiconductor process with low cost and high reliability.

Thus, to achieve the abovementioned another objective of the present invention, the inventor proposes a manufacturing method for a waveguide coupling device with properties of forward coupling and backward coupling, comprising the steps of: (1) fabricating a substrate; (2) forming a inverted taper coupling structure on the substrate; (3) making the inverted taper coupling structure to a lateral wedge-shaped structure by way of photolithography and etching; (4) forming a intermediate layer on the substrate and making the intermediate layer cover the inverted taper coupling structure; (5) coating a photographic material on the intermediate layer; (6) fabricating a mold; (7) using the mold to imprint the photographic material, and making the layer become a vertical wedge structure; and (8) respectively making the lateral sides of the structure to a wedge shape by way of photolithography.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein:

FIG. 7 is a side view of a substrate and a coupling layer of the waveguide coupling device with properties of forward coupling and backward coupling;

FIG. 8 is a second side view of the substrate and the inverted taper coupling structure of the waveguide coupling device with properties of forward coupling and backward coupling;

DETAILED DESCRIPTION OF THE INVENTION

To further describe a waveguide coupling device with properties of forward coupling and backward coupling as well as a manufacturing method thereof according to the present invention, embodiments of the present invention will be described in detail with reference to the attached drawings hereinafter.

Figure 1:
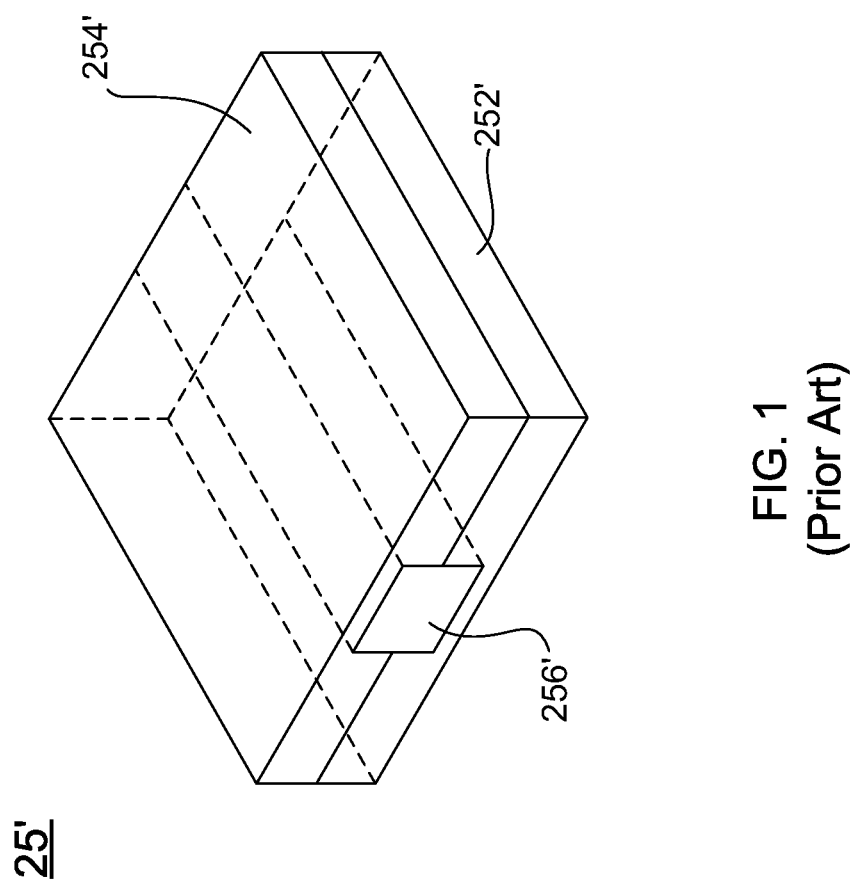
FIG. 1 is a stereo view of a conventional optical waveguide device.
Figure 2:
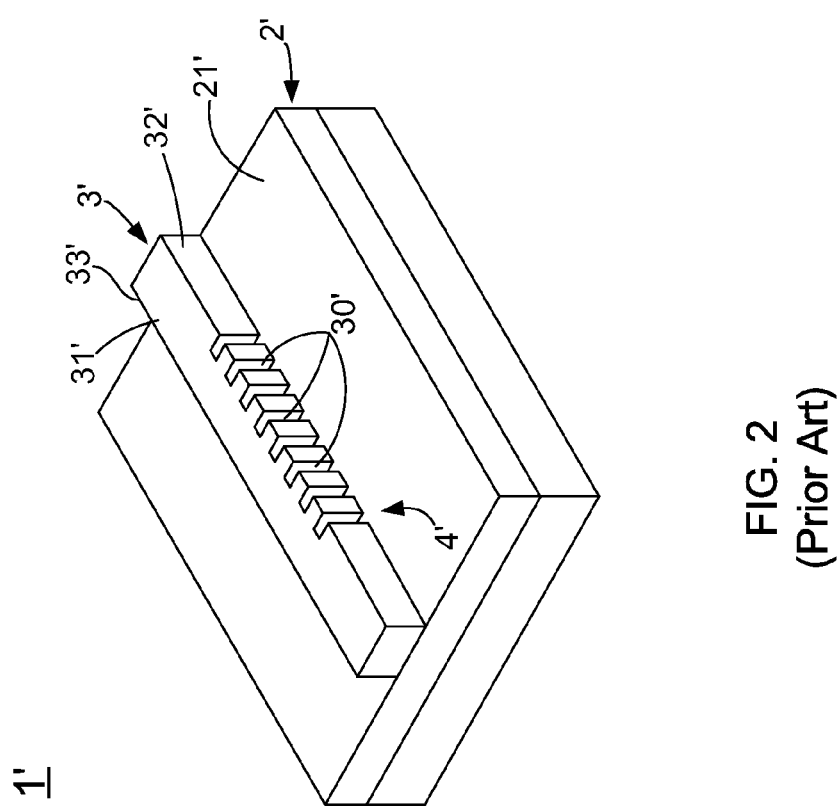
FIG. 2 is a stereo view of a conventional optical waveguide device with a surface grating.
Figure 3:
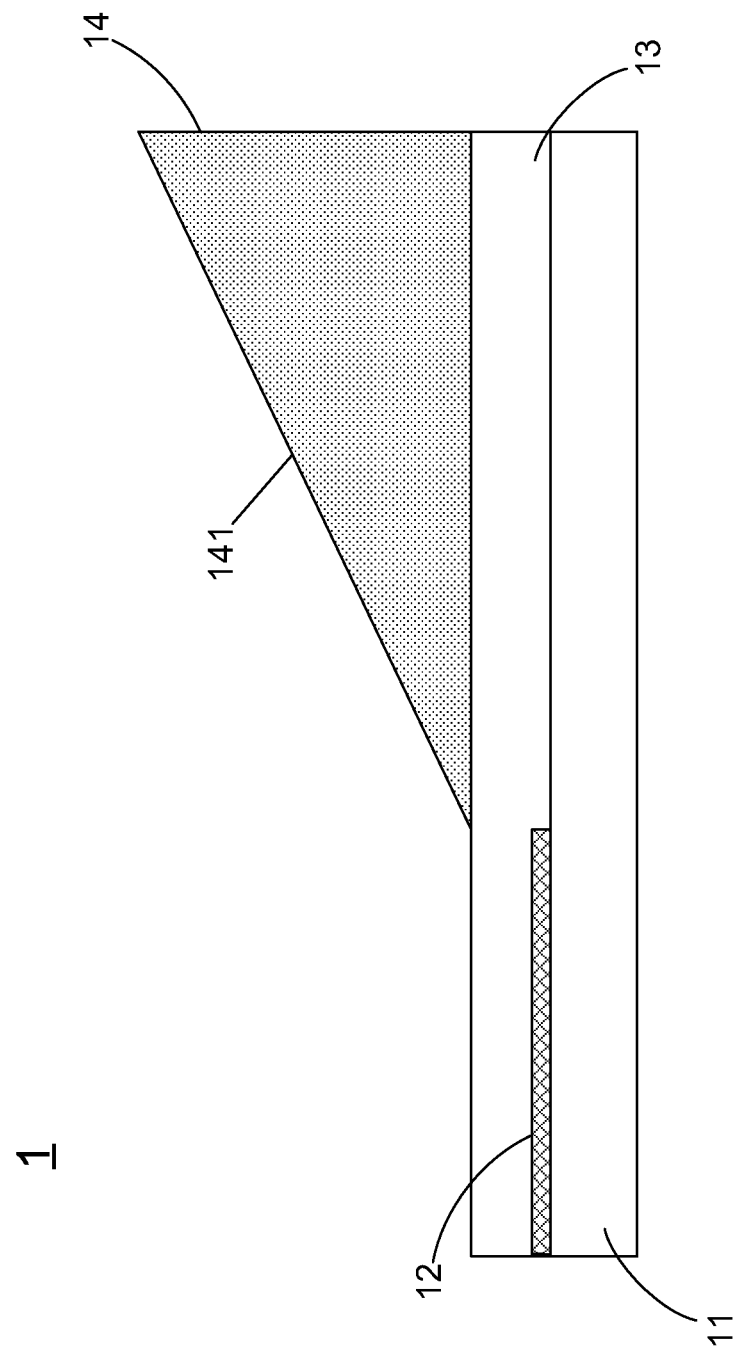
FIG. 3 is a side view of a waveguide coupling device with properties of forward coupling and backward coupling according to the present invention.
Figure 4:
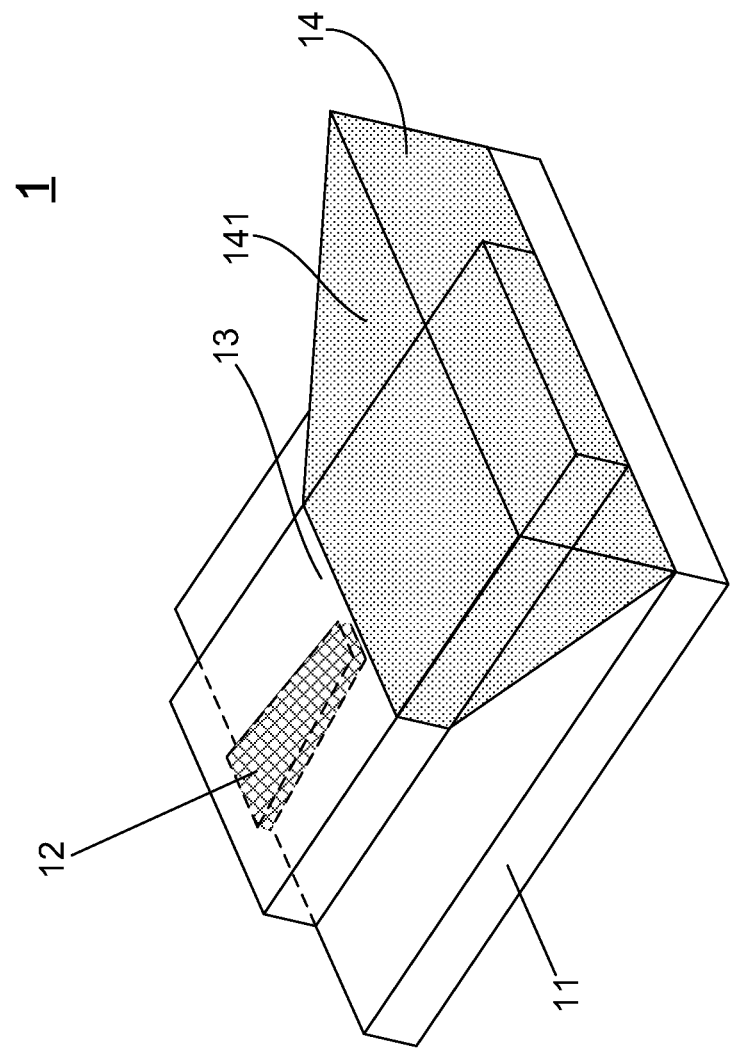
FIG. 4 is a stereo view of the waveguide coupling device with properties of forward coupling and backward coupling according to the present invention.
Figure 5:
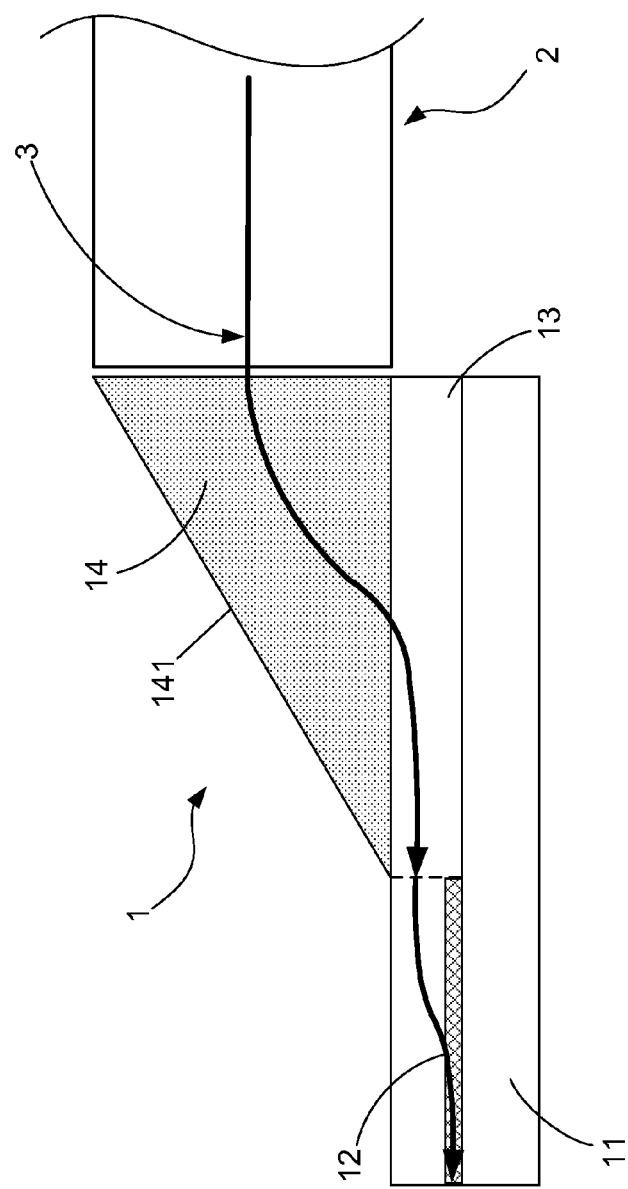
FIG. 5 is a second side view of the waveguide coupling device with properties of forward coupling and backward coupling according to the present invention.

Please refer to FIG. 3 and FIG. 4; there are shown a side view and a stereo view of a waveguide coupling device with properties of forward coupling and backward coupling according to the present invention; moreover, please simultaneously refer to FIG. 5, which illustrates a second side view of the waveguide coupling device with properties of forward coupling and backward coupling. As shown in FIG. 3 and FIG. 4, the waveguide coupling device 1 with coupling properties of forward and backward includes: a substrate 11, an inverted taper coupling structure 12, an intermediate layer 13, and a three-dimensional taper coupling structure 14, wherein the substrate 11 can be a semiconductor substrate, a compound semiconductor substrate and a glass substrate, and preferably, in the embodiment of the waveguide coupling device 1 with coupling properties of forward and backward, the substrate 11 is a compound semiconductor substrate consisting of a silicon layer and a insulator layer, i.e., the substrate 11 is an SOI substrate.

The inverted taper coupling structure 12 is formed on the substrate 11, used for confining and propagating an optical wave 3 in the inside thereof. The manufacturing material of the inverted taper coupling structure 12 can be silicon (Si), silicon nitride (SiN), silicon oxinitride (SiON), and silicon carbine (SiC), and preferably, in the embodiment of the waveguide coupling device 1, silicon (Si) is used for manufacturing the inverted taper coupling structure 12.

As shown in FIG. 5, the intermediate layer 13 is formed on the substrate and covering the inverted taper coupling structure. Similar to the inverted taper coupling structure 12, the manufacturing material of the intermediate layer 13 can be a semiconductor material or a compound semiconductor material, and preferably, in the present invention, it uses the SiON to manufacturing the intermediate layer 13. The three-dimensional taper coupling structure 14 is a photographic material with material code SU-8, which is formed on the intermediate layer 13. Moreover, the height of one end of the three-dimensional taper coupling structure 14 is adequate for connecting with an external fiber 2, so as to couple the optical wave 3 transported by the fiber 2.

Referring to FIG. 3 and FIG. 4 again, when the three-dimensional taper coupling structure 14 is connected to the fiber 2, the optical wave 3 is coupled into the three-dimensional taper coupling structure 14, at the meantime, because the refractive index $n_m$ of the intermediate layer 13 is very close to the refractive index $n_{cd}$ of the three-dimensional taper coupling structure 14, the optical wave 3 would regard the intermediate layer 13 and the three-dimensional taper coupling structure 14 as the identical material when propagating in the three-dimensional taper coupling structure 14, such that the optical wave 3 may be losslessly coupled into the inverted taper coupling structure 12 through the intermediate layer 13. Moreover, since the refractive index $n_{ctd}$ of inverted taper coupling structure 12 is greater than the refractive index $n_m$ of the intermediate layer 13, the refractive index $n_{cd}$ of the three-dimensional taper coupling structure 14 is greater than the refractive index $n_{air}$ of the air, and the refractive index $n_{sub}$ of the substrate 11 is greater than the refractive index $n_{air}$ of the air, the optical wave 3 coupled into the inverted taper coupling structure 12 can be confined and propagates in the inverted taper coupling structure 12, such that the optical leakage is effectively prevented.

Moreover, as shown in FIG. 5, the three-dimensional taper coupling structure 14 shows a slanting surface 141. In the waveguide coupling device 1 with coupling properties of forward and backward of the present invention, if the surface slope of the slanting surface 141 is getting higher, the optical coupling efficiency of the three-dimensional taper coupling structure 14 to the optical wave 3 may be also relatively increased. Besides, according to the experimental result, it could be found that the optical coupling efficiency of the three-dimensional taper coupling structure 14 is greater than 90% when the included angle between the slanting surface 141 and the surface of the media layer 13 is smaller than 0.67 degree. Moreover, in the waveguide coupling device 1 with coupling properties of forward and backward of the present invention, the inverted taper coupling structure 12 is manufactured to a lateral wedge-shaped structure for making the optical wave 3 be confined in the inverted taper coupling structure 12.

Figure 6:
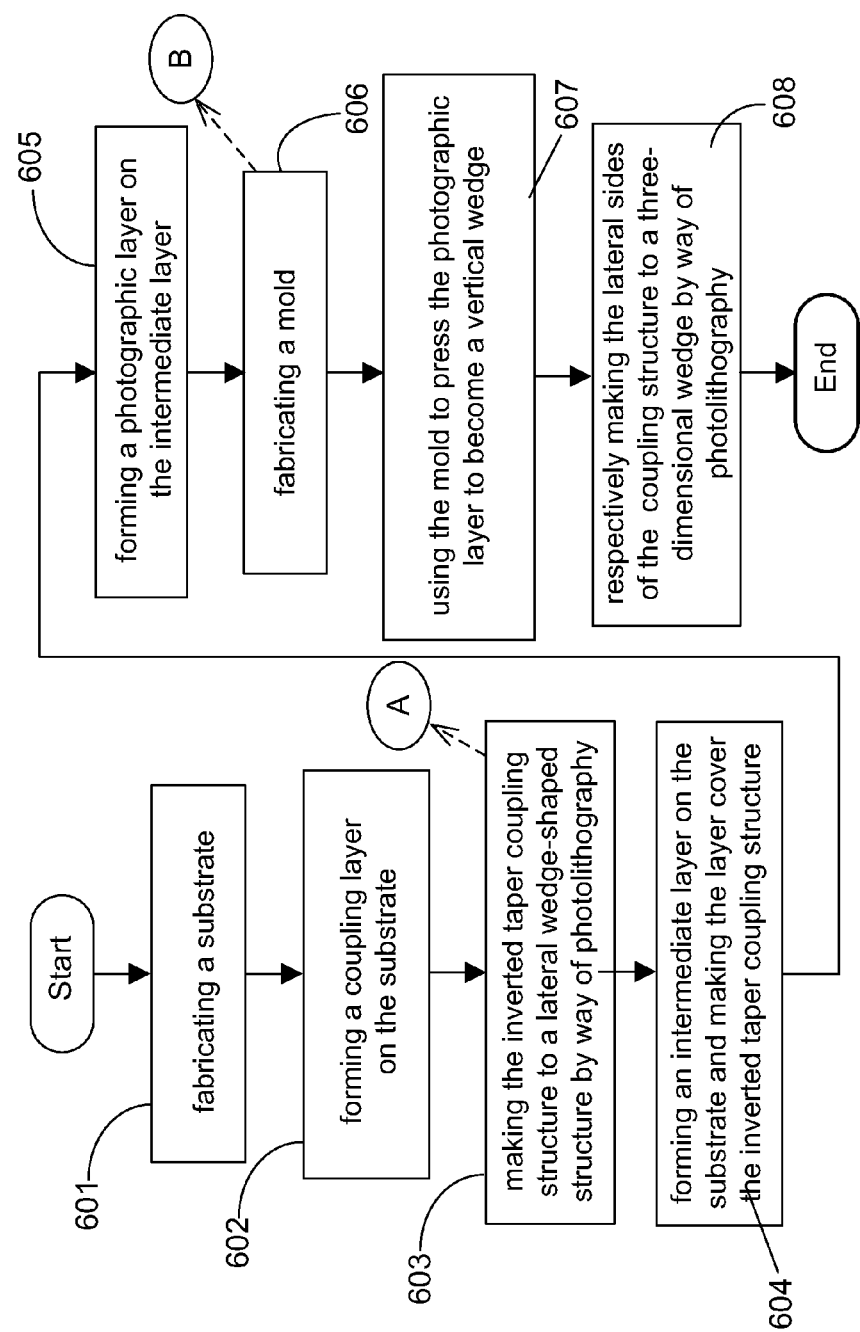
FIG. 6 is a flow chart of a manufacturing method for a waveguide coupling device with properties of forward coupling and backward coupling according to the present invention.

Therefore, through above descriptions, it knows that the waveguide coupling device 1 is a waveguide coupling device with high efficiency. Furthermore, in addition to the waveguide coupling device 1 with coupling properties of forward and backward, the present invention also provides a manufacturing method for the waveguide coupling device with properties of forward coupling and backward coupling, so that the above-mentioned waveguide coupling device 1 can be massively fabricated by the present semiconductor process. Please refer to FIG. 6, which illustrates a flow chart of the manufacturing method for the waveguide coupling device with properties of forward coupling and backward coupling according to the present invention. As shown in FIG. 6, the manufacturing method includes the steps as follows:

Firstly, executing step (601), fabricating a substrate 11. Then the flow is proceeded to step (602), forming an inverted taper coupling layer 12 on the substrate 11. Please refer to FIG. 7, which illustrates a side view of the substrate and the inverted taper coupling layer of the waveguide coupling device with properties of forward coupling and backward coupling. As shown in FIG. 7, after the step (602) is finished, the inverted taper coupling layer 12 has been formed on the substrate 11. The flow continuously proceeds to step (603), making the inverted taper coupling layer 12 to a lateral wedge-shaped structure by way of photolithography and etching. Please refer to FIG. 8, which illustrates a second side view of the substrate and the inverted taper coupling structure. As shown in FIG. 8, for making the optical wave be confined and propagate in the inverted taper coupling structure 12, the inverted taper coupling layer 12 is manufactured to the lateral wedge-shaped structure.

Figure 9:
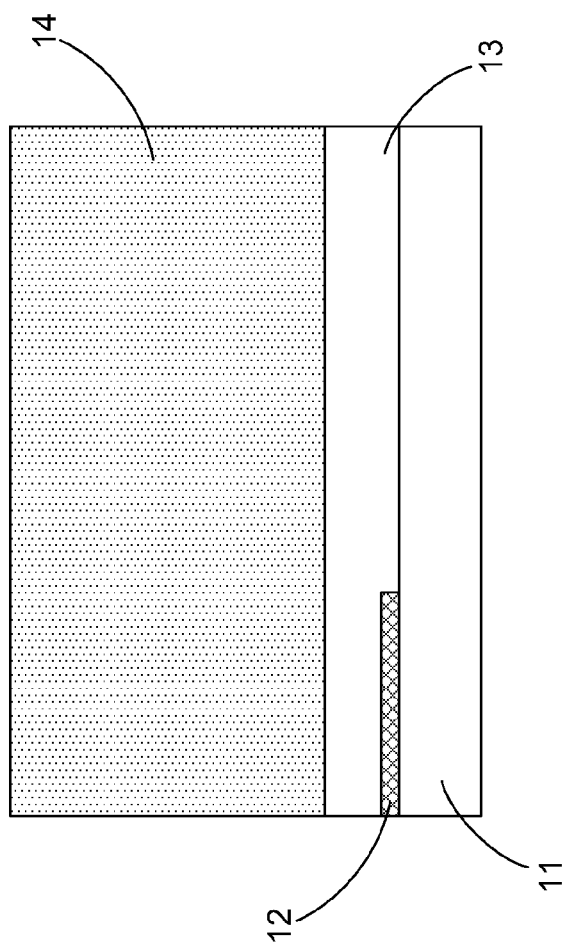
FIG. 9 is a side view of the substrate, the inverted taper coupling structure, an intermediate layer, and a photographic layer of the waveguide coupling device with properties of forward coupling and backward coupling.

After the step (603) is completed, next, the flow is proceeded to step (604), forming an intermediate layer 13 on the substrate 11 and making the intermediate layer 13 covering the inverted taper coupling structure 12; Then, continuously proceeding to step (605), forming a photographic layer 14 on the media layer 13. Please refer to FIG. 9, which illustrates a side view of the substrate, the inverted taper coupling structure, the intermediate layer, and the photographic layer of the waveguide coupling device with properties of forward coupling and backward coupling. As shown in FIG. 9, the intermediate layer 13 is formed on the substrate 11 by using the technology of plasma enhanced chemical vapor deposition (PECVD), moreover, when using the PECVD, an N2 gas, an N2O gas, an SiH4 gas, and an NH3 gas are flowed for being the reactive gases, and then the SiON layer with the refraction coefficient 1.56 has been formed on the substrate 11 and is used as the intermediate layer 13. Besides, the photographic layer 14 is a photographic material with the material code SU-8.

Figure 10:
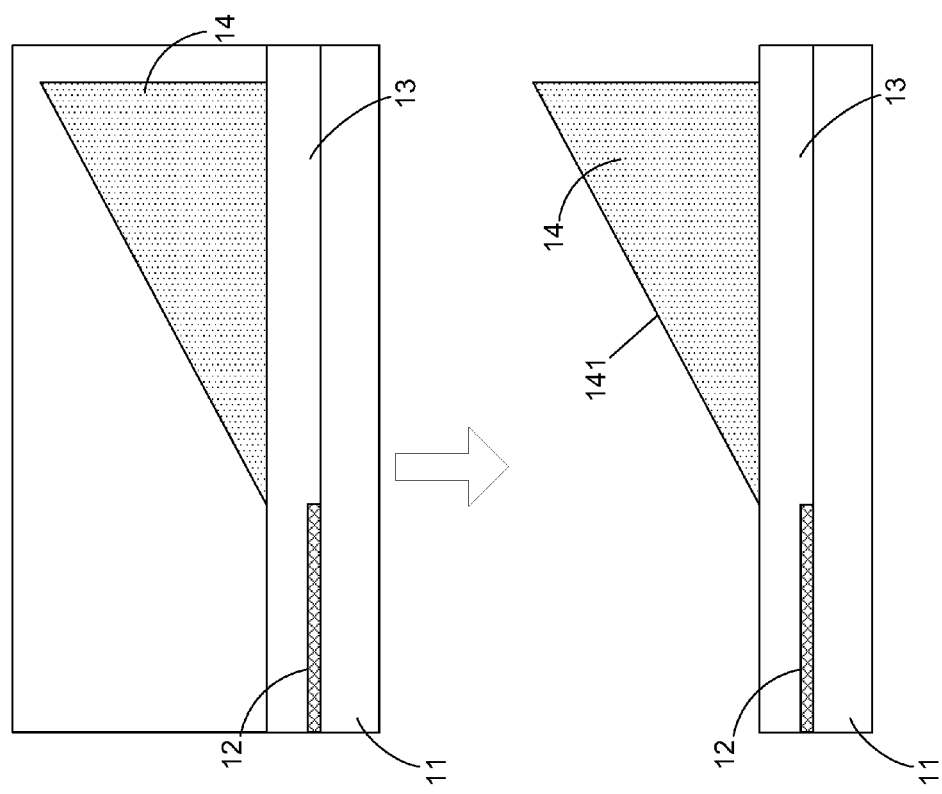
FIG. 10 is a schematic diagram for using a mold to make the photographic layer become a vertical wedge structure.

Moreover, please refer to FIG. 10, there is shown a schematic diagram for using a mold to make the photographic layer become a vertical wedge structure. As shown in FIG. 10, after the step (605) is finished, the flow is proceeded to step (606) and step (607), fabricating a mold 4 and using the mold 4 to press the photographic layer 14, so as to make the photographic layer 14 become a vertical wedge structure. Finally, the flow is proceeded to step (608), respectively making the lateral sides of the photographic layer 14 to a wedged shape by way of photolithography. Therefore, the three-dimensional taper coupling structure 14 and the waveguide coupling device 1 with coupling properties of forward and backward shown in FIG. 3 has been carried out through the step (601)~the step (608).

Figure 11:
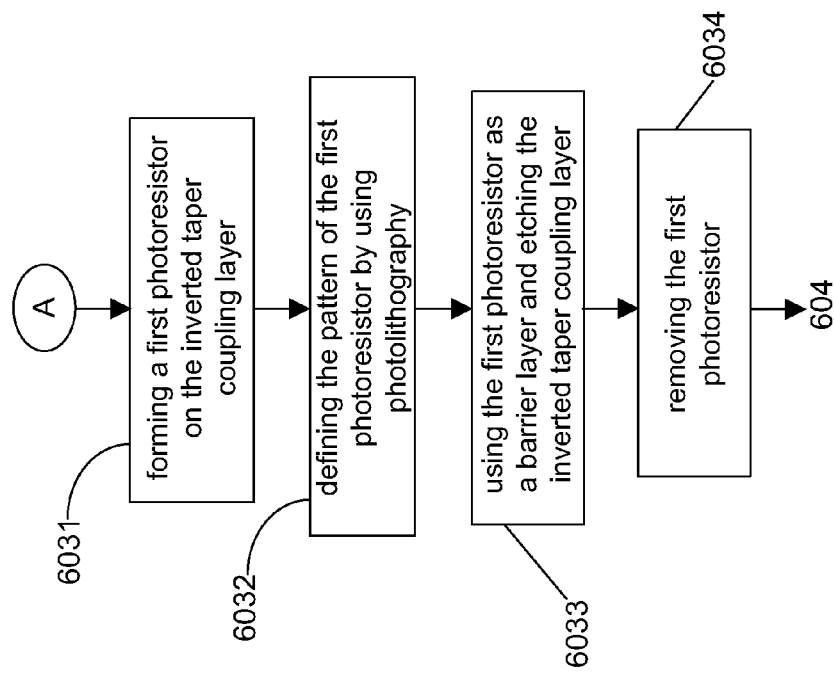
FIG. 11 is a detailed flow chart of step (603)
Figure 12:
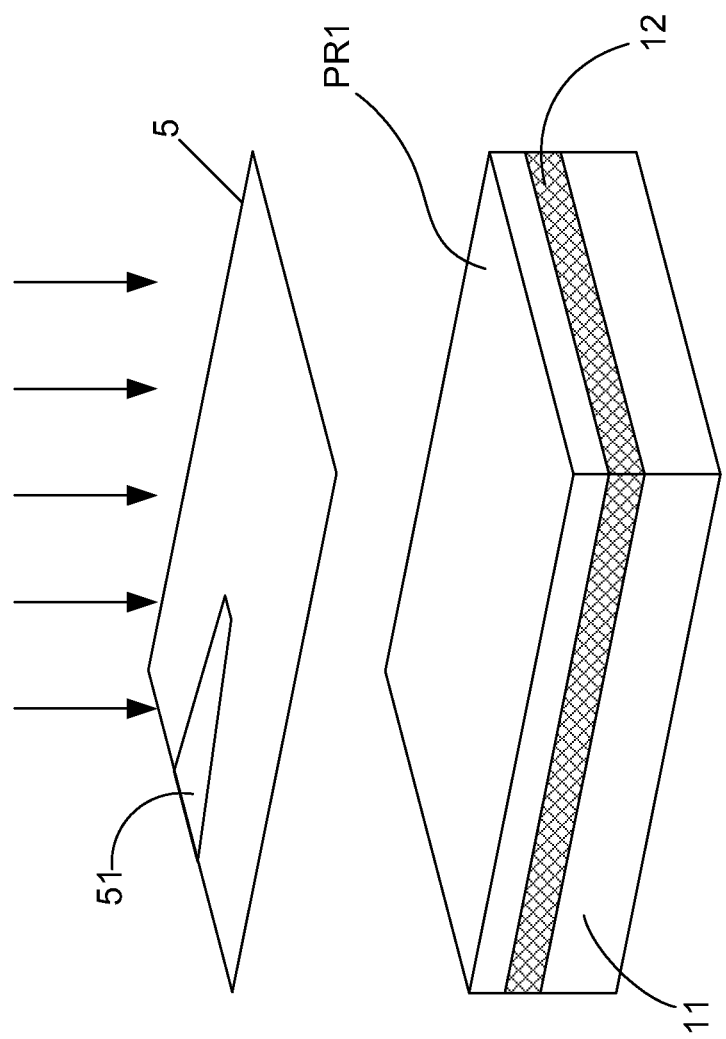
FIG. 12 is a schematic diagram for exposing the photographic layer by using a first mask.

In addition, for further introducing the manufacturing method provided in the present invention, please refer to FIG. 11, which illustrates a detailed flow chart of the step (603). The step (603) is a process flow for making the inverted taper coupling layer 12 to the lateral wedge-shaped structure, in which, as shown in FIG. 11, the step (603) further includes the detailed steps as follows:

Firstly, executing step (6031), forming a first photoresistor PR1 on the inverted taper coupling layer 12, and then executing step (6032), defining the pattern of the first photoresist PR1 by using photolithography. Please refer to FIG. 12, there is shown a schematic diagram for exposing the first photoresistor by using a first mask. As shown in FIG. 12, a first mask 5 having a wedged pattern 51 is used for exposing the first photoresist PRI, such that the wedged pattern 51 is transferred onto the first photoresist PR1 after the exposure is finished. Furthermore, through the development, the first photoresistor PR1 is developed to the lateral wedge-shaped structure.

Figure 13:
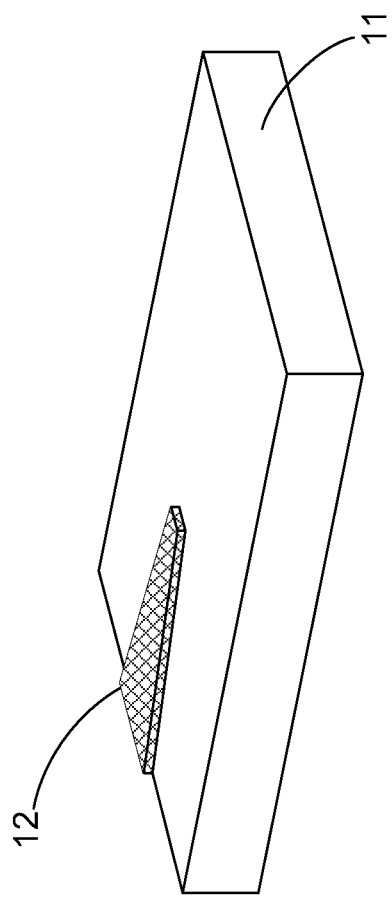
FIG. 13 is a stereo view of the substrate and the inverted taper coupling structure of the waveguide coupling device with properties of forward coupling and backward coupling.

After the step (6032) is completed, the flow is proceeded to step (6033), using the first photoresistor PR1 as a barrier layer and etching the inverted taper coupling layer 12; Finally, executing step (6034), removing the first photoresistor PR1. Please refer to FIG. 13, which illustrate a stereo view of the substrate and the inverted taper coupling structure. As shown in FIG. 13, the inverted taper coupling structure 12 with a lateral wedge-shaped structure has been formed on the substrate 11.

Figure 14:
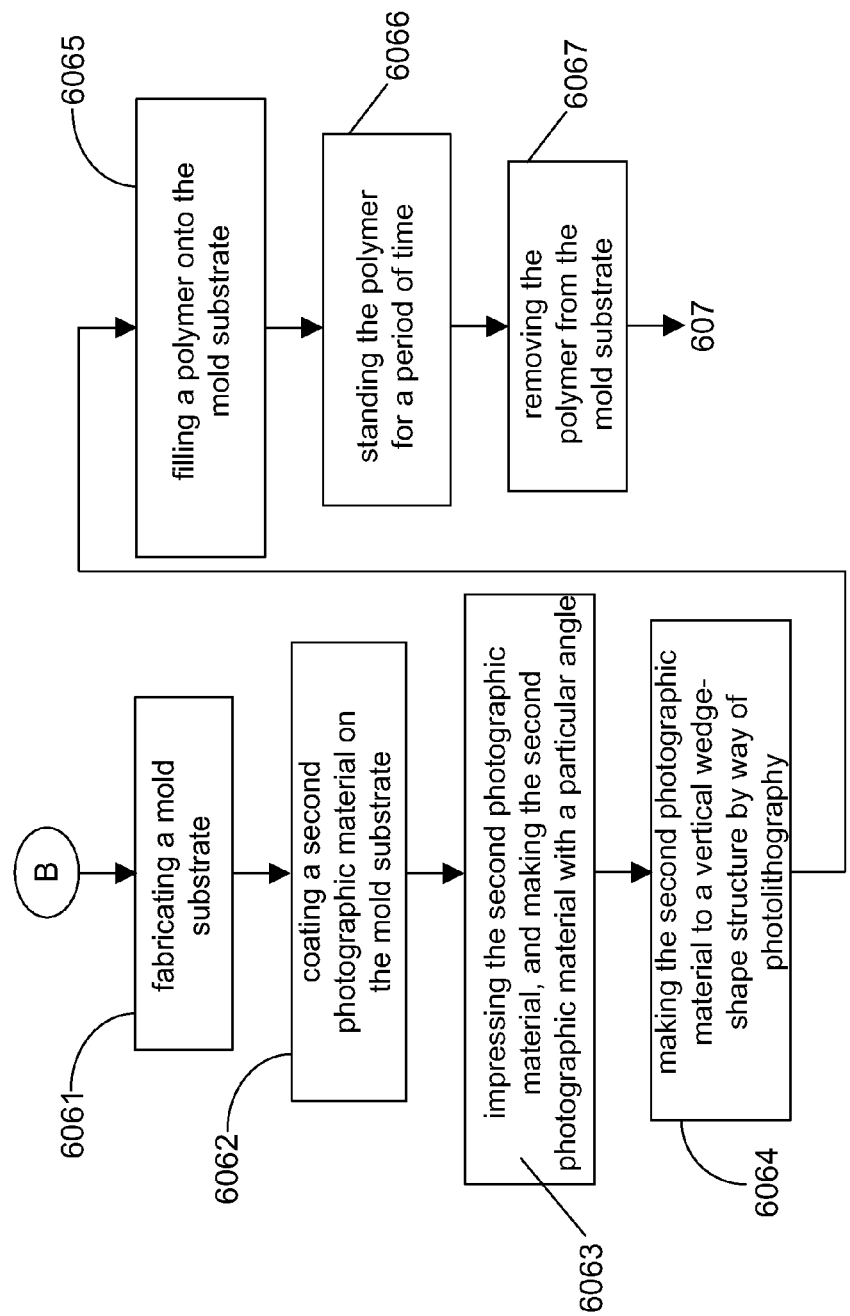
FIG. 14 is a detailed flow chart of step (606)
Figure 15:
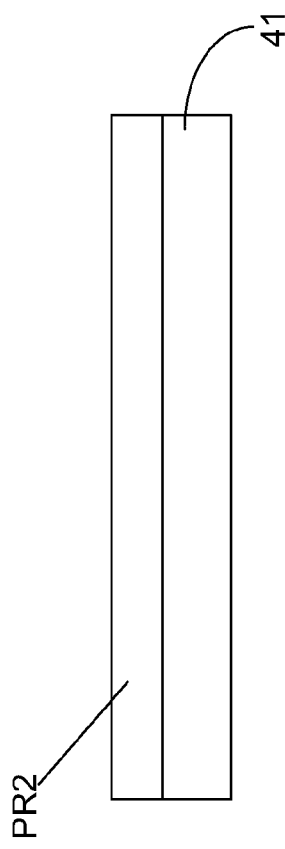
FIG. 15 is a side view of a mold substrate and a second photographic material.

Moreover, please refer to FIG. 14, which illustrates a detailed flow chart of step (606). The step (606) is a process flow for fabricating the mold 4, in which, as shown in FIG. 14, the step (606) further includes the detailed steps as follows:

Firstly, executing step (6061), fabricating a mold substrate 41, wherein the mold substrate 41 can be a semiconductor substrate, a compound semiconductor substrate or a glass substrate; in this manufacturing method, it uses the silicon (Si) substrate as the mold substrate 41. Continuously, the flow is proceeded to step (6062), coating a second photographic material PR2 on the mold substrate 41. Please refer to FIG. 15, which illustrates a side view of the mold substrate and the second photographic material. As shown in FIG. 15, after the step (6062) is completed, the second photographic material PR2 has been coated on the mold substrate 41.

Figure 16:
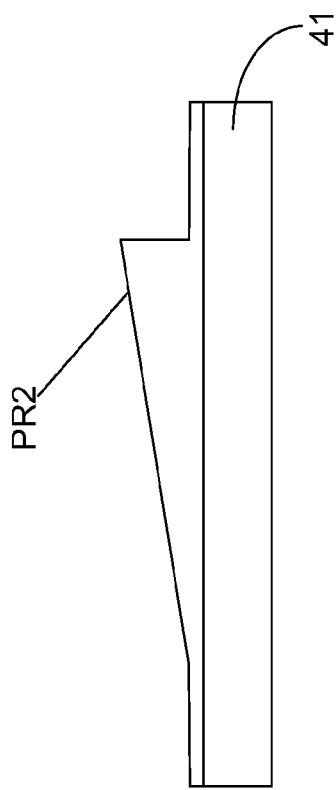
FIG. 16 is a second side view of the mold substrate and the second photographic material after oblique impress.

The flow next proceeds to step (6063), pressing the second photographic material PR2, and making the second photographic material PR2 show a particular angle. Please refer to FIG. 16, which illustrates a second side view of the mold substrate and the second photographic material. As shown in FIG. 16, after using a board to impress the second photographic material PR2, the second photographic material PR2 shows the particular angle on the mold substrate 41. So that, after the step (6063) is finished, the flow is proceeded to step (6064), making the second photographic material PR2 to a vertical wedge structure 42 by way of photolithography. Herein, it needs to explain that, the purpose of exposing the second photographic material PR2 is to transfer the wedged pattern onto the second photographic material PR2, so that, when developing the second photographic material PR2, it can make the second photographic material PR2 become the vertical wedge structure 42 for getting the best optical coupling efficiency.

Figure 17:
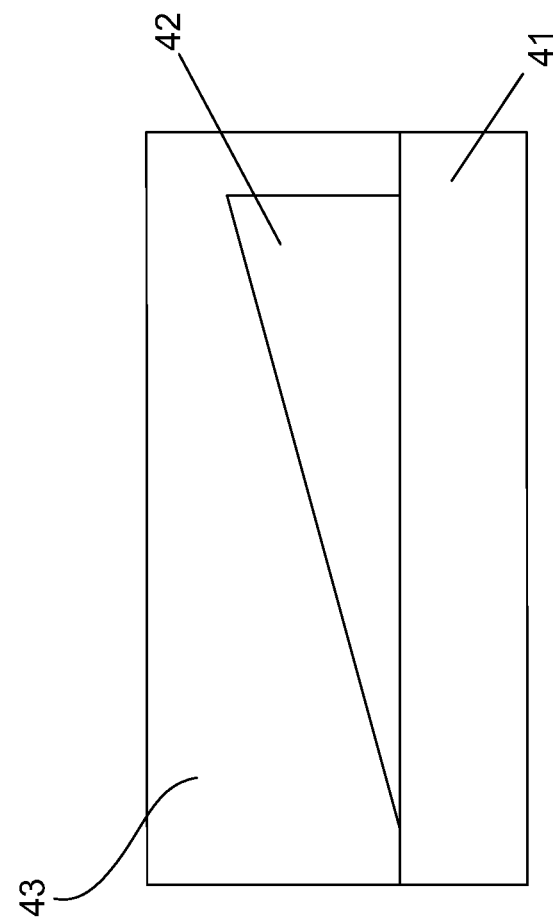
FIG. 17 is a side view of the mold substrate, the second impressed photographic material and a covering polymer.
Figure 18:
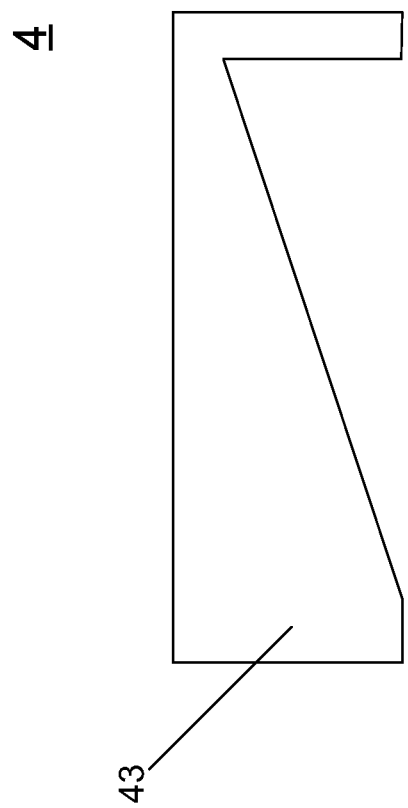
FIG. 18 is a side view of the covering polymer (a vertical tapered mold) after de-molding.

The flow next proceeds to step (6065), filling a polymer 43 onto the mold substrate 41. Please refer to FIG. 17, which illustrates a side view of the mold substrate, the second photographic material and the polymer. As shown in FIG. 17, after the polymer 43 us filled onto the mold substrate 41, the polymer 43 would solidify slowly. Therefore, after the step (6065) is completed, the flow is proceeded to step (6066), standing the polymer 43 for a period of time; and finally, executing step (6067), removing the polymer 43 from the mold substrate 41. Please refer to FIG. 18, which illustrate the side view of the mold. As shown in FIG. 15, the solidified polymer 43 forms the mold 4.

Thus, through the above descriptions, the waveguide coupling device with properties of forward coupling and backward coupling as well as a manufacturing method thereof of the present invention have been disclosed completely and clearly, in summary, the present invention has the following advantages:

1. The structure of the waveguide coupling device with properties of forward coupling and backward coupling provided by the present invention is very simple, and the three-dimensional taper coupling structure thereof is able to be connected with a fiber.
2. The optical coupling efficiency of the waveguide coupling device with properties of forward coupling and backward coupling provided by the present invention is very high, in which, by way of selecting the proper refraction coefficients of the inverted taper coupling structure, the intermediate layer and the three-dimensional taper coupling structure, the optical wave can be efficiently coupled into the inverted taper coupling structure through the coupling sequence of (three-dimensional taper coupling structure)-(intermediate layer)-(inverted taper coupling structure), and then the optical wave is confined and propagates in the inverted taper coupling structure connecting to waveguide devices.
3. Inheriting to above point 2, by way of the high efficient coupling of (three-dimensional taper coupling structure)-(intermediate layer)-(inverted taper coupling structure), the working optical wavelength can be applied for a whole optical communication band.
4. Through the manufacturing method provided in the present invention, the waveguide coupling device with properties of forward coupling and backward coupling can be massively fabricated by the present semiconductor process with low cost, and it not needs to using any other particular equipments when executing the processes.

The above description is made on embodiments of the present invention. However, the embodiments are not intended to limit scope of the present invention, and all equivalent implementations or alterations within the spirit of the present invention still fall within the scope of the present invention.

We claim:

1. A waveguide coupling device with properties of forward coupling and backward coupling, comprising:
    a substrate;
    at least one inverted taper coupling structure, being formed on the substrate for confining and propagating an optical wave in the inside thereof;
    an intermediate layer, being formed on the substrate and covering the inverted taper coupling structure; and
    at least one three-dimensional taper coupling structure, being formed on the intermediate layer and used for connecting to an external fiber by one terminal thereof, so as to couple the optical wave transported by the fiber;
    wherein the refractive index of the intermediate layer is very close to the refractive index of the three-dimensional taper coupling structure, therefore, the optical wave would regard the intermediate layer and the three-dimensional taper coupling structure as the identical material when propagating in the three-dimensional taper coupling structure, such that the optical wave may be coupled into the inverted taper coupling structure through the intermediate layer.

2. The waveguide coupling device with properties of forward coupling and backward coupling of claim 1, wherein the substrate is selected from the group consisting of: semiconductor substrate, compound semiconductor substrate and glass substrate.

3. The waveguide coupling device with properties of forward coupling and backward coupling of claim 1, wherein the manufacturing material of inverted taper coupling structure is selected from the group consisting of: silicon (Si), silicon nitride (SiN), silicon oxinitride (SiON), and silicon carbine (SiC).

4. The waveguide coupling device with properties of forward coupling and backward coupling of claim 3, wherein the inverted taper coupling structure shows a lateral wedge-shaped structure.

5. The waveguide coupling device with properties of forward coupling and backward coupling of claim 1, wherein the material of the intermediate layer is selected from the group consisting of: semiconductor material and compound semiconductor material.

6. The waveguide coupling device with properties of forward coupling and backward coupling of claim 1, wherein three-dimensional taper coupling structure is a photographic material with the material code SU-8.

7. The waveguide coupling device with properties of forward coupling and backward coupling of claim 6, wherein the three-dimensional taper coupling structure shows a three-dimensional wedge shape with a slanting surface, moreover, if the surface slope of the slanting surface is getting higher, the optical coupling efficiency of the three-dimensional taper coupling structure to the optical wave 3 may be also relatively increased.

8. The waveguide coupling device with properties of forward coupling and backward coupling of claim 1, wherein the refractive index of the inverted taper coupling structure is greater than the refractive index of the intermediate layer, the refractive index of the three-dimensional taper coupling structure is greater than the refractive index of the air, and the refractive index of the substrate is greater than the refractive index of the air.

9. The waveguide coupling device with properties of forward coupling and backward coupling of claim 1, wherein by way of the high efficient coupling of (three-dimensional taper coupling structure)-(intermediate layer)-(inverted taper coupling structure), the working optical wavelength can be applied for a whole optical communication band.

10. The waveguide coupling device with properties of forward coupling and backward coupling of claim 1, wherein the three-dimensional taper coupling structure further comprises a slanting surface, such that the optical coupling efficiency of the three-dimensional taper coupling structure is greater than 90% when the included angle between the slanting surface and the surface of the media layer is smaller than 0.67 degree.

11. A manufacturing method for a waveguide coupling device with properties of forward coupling and backward coupling, comprising the steps of:
  (1) fabricating a substrate;
  (2) forming an inverted taper coupling layer on the substrate;
  (3) making the inverted taper coupling structure to a lateral wedge-shaped structure by way of photolithography and etching;
  (4) forming an intermediate layer on the substrate and making the intermediate layer cover the inverted taper coupling structure;
  (5) forming a three-dimensional taper coupling layer on the intermediate layer;
  (6) fabricating a mold;
  (7) using the mold to imprint the three-dimensional taper coupling layer, and making the three-dimensional taper coupling layer become a vertical wedge shape; and
  (8) respectively making the lateral sides of the three-dimensional taper coupling structure to a wedge shape by way of photolithography.

12. The manufacturing method for a waveguide coupling device with properties of forward coupling and backward coupling of claim 11, wherein the step (3) further comprises the detailed steps of:
  (31) forming a first photoresist on the inverted taper coupling layer;
  (32) defining the pattern of the first photoresist by using photolithography;
  (33) using the first photoresist as a barrier layer and etching the inverted taper coupling layer; and
  (34) removing the first photoresist.

13. The manufacturing method for a waveguide coupling device with properties of forward coupling and backward coupling of claim 11, wherein the step (6) further comprises the detailed steps of:
  (61) fabricating a mold substrate;
  (62) coating a second photographic material on the mold substrate;
  (63) impressing the second photographic material, and making the second photographic material show a particular angle;
  (64) making the second photographic material to a vertical wedge shape by way of photolithography;
  (65) filling a polymer onto the mold;
  (66) standing the polymer for a period of time; and
  (67) removing the polymer from the mold substrate.

14. The manufacturing method for a waveguide coupling device with properties of forward coupling and backward coupling of claim 11, wherein the intermediate layer is formed on the substrate by using the technology of plasma enhanced chemical vapor deposition (PECVD).

15. The manufacturing method for a waveguide coupling device with properties of forward coupling and backward coupling of claim 14, wherein when using technology of plasma enhanced chemical vapor deposition (PECVD), an $N_2$ gas, an $N_2O$ gas, an $SiH_4$ gas, and an $NH_3$ gas are flowed for being the reactive gases.

16. The manufacturing method for a waveguide coupling device with properties of forward coupling and backward coupling of claim 13, wherein the material code of the second photographic material is SU-8.

17. The manufacturing method for a waveguide coupling device with properties of forward coupling and backward coupling of claim 13, wherein the material of the polymer is poly-dimethylsiloxan (PDMS).

18. The manufacturing method for a waveguide coupling device with properties of forward coupling and backward coupling of claim 13, wherein mold substrate is selected from the group consisting of: semiconductor substrate, compound semiconductor substrate and a glass substrate.

* * * * *